United States Patent
Knaappila

(10) Patent No.: US 9,414,217 B2
(45) Date of Patent: Aug. 9, 2016

(54) METHOD AND TECHNICAL EQUIPMENT FOR SHORT RANGE DATA TRANSMISSION

(71) Applicant: Silicon Laboratories Finland Oy, Espoo (FI)

(72) Inventor: Jere Knaappila, Evitskog (FI)

(73) Assignee: Silicon Laboratories Finland Oy, Espoo (FI)

( * ) Notice: Subject to any disclaimer, the term of this patent is extended or adjusted under 35 U.S.C. 154(b) by 0 days.

(21) Appl. No.: 14/697,046

(22) Filed: Apr. 27, 2015

(65) Prior Publication Data

US 2015/0319600 A1 Nov. 5, 2015

(30) Foreign Application Priority Data

May 5, 2014 (FI) ..................... 20145404

(51) Int. Cl.
*H04B 7/00* (2006.01)
*H04W 8/00* (2009.01)
*H04W 48/02* (2009.01)
*H04W 76/02* (2009.01)

(52) U.S. Cl.
CPC ............. *H04W 8/005* (2013.01); *H04W 48/02* (2013.01); *H04W 76/023* (2013.01); *Y02B 60/50* (2013.01)

(58) Field of Classification Search
CPC ..... H04W 8/005; H04W 48/02; H04W 48/10; H04W 76/023
USPC ........................................ 455/41.2, 418, 41.1
See application file for complete search history.

(56) References Cited

U.S. PATENT DOCUMENTS

| | | | | |
|---|---|---|---|---|
| 7,920,495 B2 * | 4/2011 | Salokannel | ........... | H04W 72/10 370/310 |
| 8,005,465 B2 * | 8/2011 | Salokannel | ........... | G06Q 30/02 455/414.1 |
| 8,583,042 B2 * | 11/2013 | Cutrignelli | ........... | H04W 84/20 370/329 |
| 8,929,192 B2 * | 1/2015 | Kainulainen | ............. | G01S 3/48 342/147 |
| 8,965,785 B2 * | 2/2015 | Lee | ..................... | G06Q 30/0241 705/14.4 |
| 9,020,433 B2 * | 4/2015 | Linde | .................... | H04W 8/005 455/39 |
| 9,042,829 B2 * | 5/2015 | Palin | .................... | H04W 4/008 370/252 |
| 2011/0251898 A1 * | 10/2011 | Scott | ...................... | G06Q 30/02 705/14.62 |
| 2011/0264523 A1 * | 10/2011 | Scott | .................... | G06Q 10/101 705/14.52 |
| 2013/0003630 A1 | 1/2013 | Xhafa et al. | | |
| 2013/0094491 A1 | 4/2013 | Sun et al. | | |
| 2013/0109315 A1 * | 5/2013 | Polo | .................. | H04W 52/0274 455/41.2 |
| 2013/0235166 A1 * | 9/2013 | Jones | ..................... | H04N 13/04 348/51 |

FOREIGN PATENT DOCUMENTS

EP 2587868 A2 9/2012
WO WO2013/066938 A1 5/2013

OTHER PUBLICATIONS

Search Report, FI20145404, Nov. 17, 2014, 1 pg.

* cited by examiner

*Primary Examiner* — Marceau Milord
(74) *Attorney, Agent, or Firm* — Egan, Peterman, Enders & Huston LLP

(57) ABSTRACT

Disclosed herein are apparatus and methods capable in one example of transmitting a first advertisement packet indicating that an advertising device is scannable; receiving a scan request from at least one scanning device; determining, based on the received one or more scan requests, whether a corresponding one or more scanning device is an allowed for connection; transmitting a second advertisement packet indicating that said advertising device is connectable; and receiving connection requests from the allowed at least one scanning device.

21 Claims, 5 Drawing Sheets

METHOD AND TECHNICAL EQUIPMENT FOR SHORT RANGE DATA TRANSMISSION

This application claims priority to co-pending Finnish patent application serial number 20145404 filed on May 5, 2014, the disclosure of which is incorporated herein by reference in its entirety for all purposes.

TECHNICAL FIELD

The present application relates to Bluetooth modules. In particular, the present application relates to Bluetooth low energy.

BACKGROUND

Bluetooth Low Energy (BLE) relates to Bluetooth wireless radio technology. It has been designed for low-power and low latency applications for wireless devices within short range. Today, BLE applications can be found from healthcare, fitness, security, smart energy, industrial automation and home entertainment. However, BLE is not limited only those, but increasingly more new application utilizing BLE technology are designed.

The difference between BLE and classic Bluetooth is that the BLE devices consume remarkably less power for communication than classic Bluetooth devices. In addition, the BLE is able to start the data transmission much quicker than the classic Bluetooth. This makes it possible to have BLE devices constantly on and to communicate intermittently with other devices.

SUMMARY

Now there has been invented an improved method and technical equipment implementing the method, by which a connection procedure between a master and a slave can be accelerated.

According to a first aspect, there is provided a method that comprises transmitting a first advertisement packet indicating that an advertising device is scannable; receiving a scan request from at least one scanning device; determining, based on the received one or more scan requests, whether a corresponding one or more scanning device is an allowed for connection; transmitting a second advertisement packet indicating that said advertising device is connectable; receiving connection requests from the allowed at least one scanning device.

According to a second aspect, there is provided an apparatus comprising processing means and memory means, wherein the apparatus is configured to transmit a first advertisement packet indicating that an advertising device is scannable; receive a scan request from at least one scanning device; determine, based on the received scan requests, whether a corresponding scanning device is an allowed for connection; transmit a second advertisement packet indicating that said advertising device is connectable; receive connection requests from the allowed at least one scanning device.

According to a third aspect, there is provided a computer program product embodied on a computer readable medium, comprising computer program code configured to, when executed on at least one processor, cause an apparatus or a system to transmit a first advertisement packet indicating that an advertising device is scannable; receive a scan request from at least one scanning device; determine, based on the received scan requests, whether a corresponding scanning device is an allowed for connection; transmit a second advertisement packet indicating that said advertising device is connectable; receive connection requests from the allowed at least one scanning device.

According to an embodiment, a list of allowed devices is generated, which list is transmitted to a link layer.

According to an embodiment, the generated list is transmitted to a link layer of the apparatus.

According to an embodiment, the determination on the allowed scanning device is based on at least one of the following data: received signal strength indication; an existing bond between devices; time period from previous connection; a manufacturer of the scanning device.

According to an embodiment, the first advertising packet is ADV_SCAN_IND packet.

According to an embodiment, the second advertising packet is ADV_IND packet.

According to an embodiment, the second advertising packet is ADV_DIRECT_IND packet comprising an indication of the allowed scanning device.

DESCRIPTION OF THE DRAWINGS

In the following, various embodiments of the invention will be described in more detail with reference to the appended drawings, in which.

DESCRIPTION OF EXAMPLE EMBODIMENTS

In the following, several embodiments of the invention will be described in the context of device filtering in BLE. It is to be noted, however, that the invention is not limited to only this radio transmission technology. In fact, the different embodiments have applications in different environments.

Figure 1:
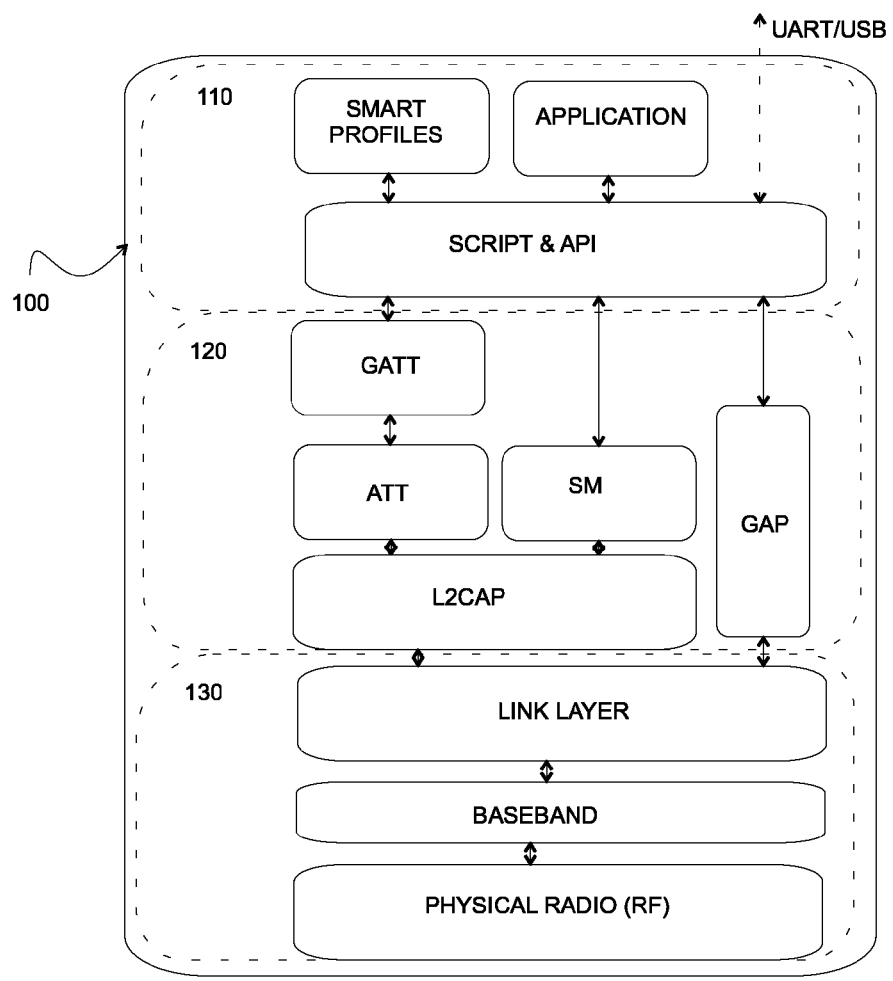
FIG. 1 shows a Bluetooth module according to an embodiment.

FIG. 1 illustrates an example of an electronic apparatus 100. According to an embodiment, the apparatus 100 is a Bluetooth module that comprises an application layer 110, host layer 120 and a Bluetooth (or BLE) controller 120. The application layer 110 comprises the apparatus related application(s) (e.g. heart rate, proximity, blood pressure, time updated, temperature, battery, . . . ), smart profiles, script and application programming interface (API). The application is capable of reading sensor data e.g. from heart rate sensor, and reporting the data to host layer for transmitting the data by means of the Bluetooth (or BLE) controller 130. The host layer 120 comprises protocols running over the connection. Host layer 120 also comprises data to be used in advertisement profile (GATT), generic access profile (GAP), attribute protocol (ATT), security manager (SM) and logical link control and adaptation protocol (L2CAP). The Bluetooth (or BLE) controller 130 comprises link layer, baseband and physical layer (i.e. physical radio, radio frequency RF).

The link layer provides ultra-low power idle mode operation and device discovery (i.e. connection mode and advertising mode handling). The link layer is also in charge for packet transmission and responding.

Figure 2:
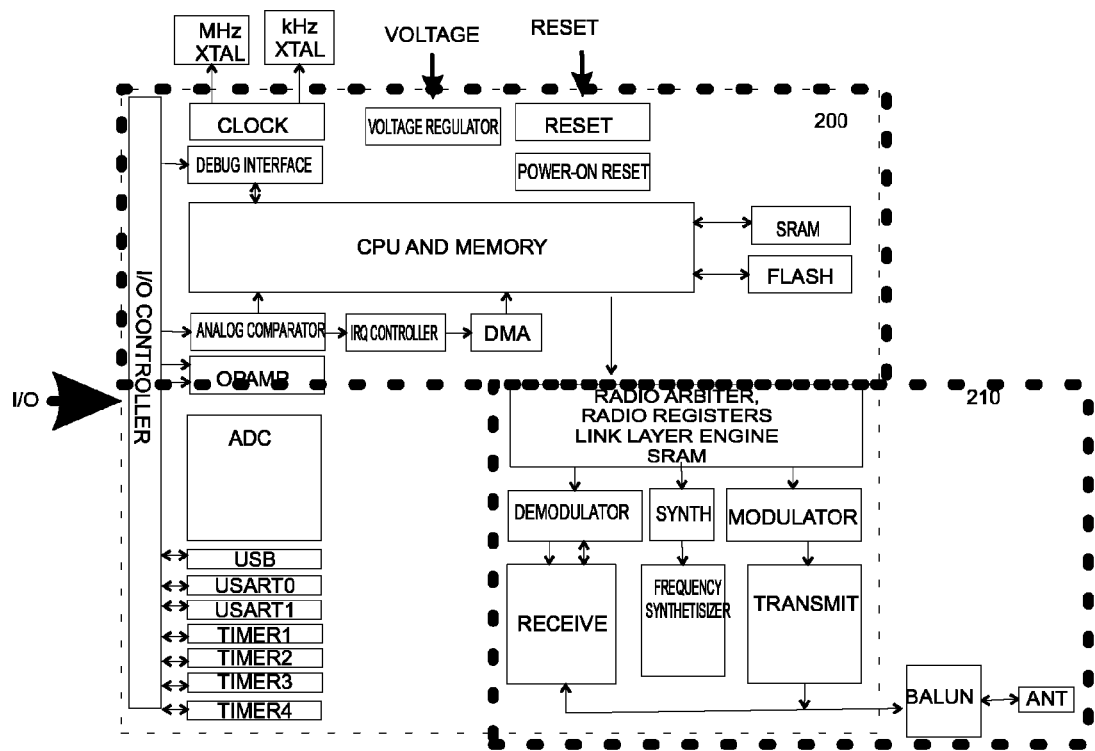
FIG. 2 shows a simplified block chart of a Bluetooth module.

FIG. 2 illustrates an example of a BLE module available on the market as a simplified block diagram. Central processing unit and memory means with application data are located in segment 200. A part of the link layer and physical layer are illustrated with reference 210. This segment 210 contains elements, such as radio registers, link layer engine, modulator-demodulator, receiving-transmitting means, frequency synthesizer, balancing-unbalancing unit (balun), antenna (ant).

In BLE technology, one or more so called slave devices can be connected to a master device. The master is able to communicate with one or more slave devices—also simultaneously. To let the master know about the slave devices, the slave devices (or at that point "advertisers") periodically, at pseudo-random intervals, pass advertisement packets which a master device (also known as scanner device, i.e. "scanner") is scanning.

Advertisement packet types from slave device are
ADV_IND connectable and scannable undirected advertising event
ADV_DIRECT_IND connectable directed advertising event
ADV_NONCONN_IND non-connectable or non-scannable undirected advertising event
ADV_SCAN_IND scannable undirected (non-connectable) advertising event If the advertiser sends either the ADV_IND or ADV_DIRECT_IND packets, a scanner desiring to exchange data with the advertiser can send a CONNECT_REQ packet. If the advertiser accepts the CONNECT_REQ packet, the devices become connected and the communication may be started. At this point, the advertiser becomes a slave and the scanner becomes a master. After connected, the master device can request bonding with the slave device. This means that the devices exchange keys or other encryption info to be stored for future connections.

Instead of the CONNECT_REQ, the scanner device may also respond with SCAN_REQ, which is a request for further information from the advertiser. This can be send as a response to ADV_IND or ADV_SCAN_IND advertising packets.

When an advertising receives SCAN_REQ packet from a scanning device, the advertising device may give more information to the scanning device by SCAN_RSP packet. SCAN_RSP packet may contain information on the name of the advertising device and on the services the advertising device is able to provide. However, SCAN_RSP packet is not limited to carry only this information but may contain other data as well or instead.

As said, scanning device wishing to connect with the advertising device sends a CONNECT_REQ packet that contains data on one or more of the following: transmit window size defining timing window for first data packet, transmit window offset that is off when the transmit window starts, connection interval which is the time between connection events, slave latency defines number of times the slave can ignore connection events from the master, connection timeout is maximum time between two correctly received packets in the connection before link is considered to be lost, hop sequence is a random number appointing the starting point for a hop, channel map, CRC (Cyclic Redundancy Check) initialization value. The CONNECT_REQ packet initiates the connection, i.e. creates a point-to-point connection between the devices.

The state for passing advertising packets is called "advertising state" and the state for connection is called "connected state". In both states, data transfer occurs. Slave device may be a sensor or an actuator, such as a temperature sensor, heart rate sensor, light bulb, proximity sensor, etc. Master device can be any electronic device capable of collecting data, e.g. mobile phone, smart phone, personal digital assistant, personal computer, laptop computer, tablet computer, etc.

Packets sent from a slave device in advertising mode may contain approximately 28 bytes of data and a slave address. Packets from a master device in advertisement channel may contain scanner and advertiser addresses. According to an embodiment, the packets from a master device in advertisement channel contains only a master address.

Figures 3A, 3B:
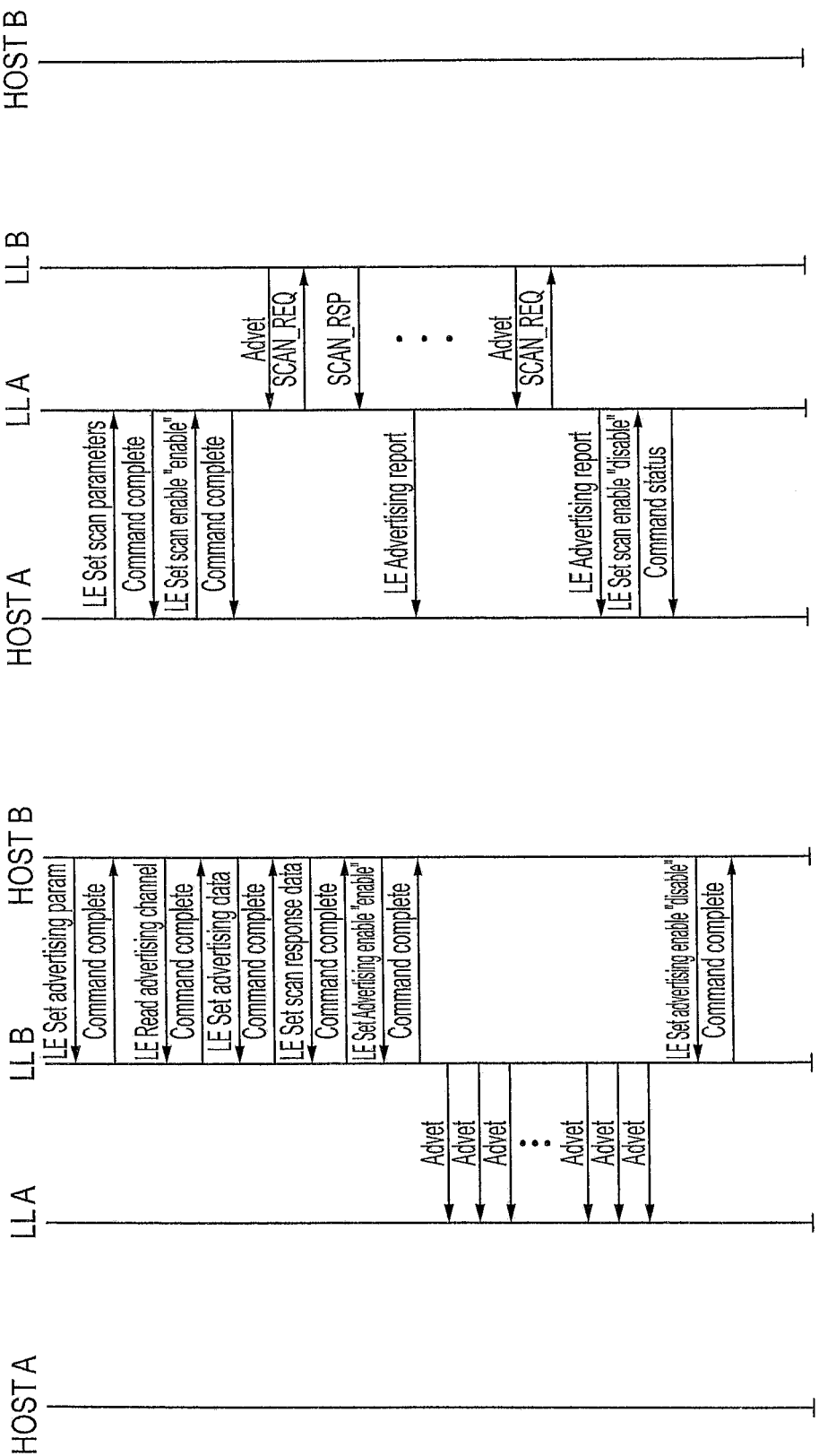
FIG. 3A shows an example of a state of art for advertising modes.
FIG. 3B shows an example of a state of art for advertising modes.

FIGS. 3a-3b illustrate technical background for advertising modes. FIG. 3a illustrates a setup of device B (Host B) to send advertisement packets. FIG. 3b illustrates a situation, where device B (Host B) is sending advertising packets and device A (Host A) is scanning the packets. Host A and host B are a master device and a slave device respectively. LLA is a link layer of the master device, i.e. host A, and LLB is a link layer of the slave device, i.e. host B. From FIG. 3b it is realized that SCAN_REQ packet from host A as a response to an advertisement packet "Advet" from link layer LLB of host B is transmitted from link layer LLA of host A. As a response to SCAN_REQ packet, the link layer LLB of the host B sends a SCAN_RSP packet with data.

Connection between the master device and the slave device can be formed by the master device sending CONNECT_REQ packet after the slave's advertisement packet. When the connection is opened, the slave device becomes aware with which device the connection is formed.

The BLE devices are capable of filtering scanning devices to which scan response are sent. Prior to the present embodiments, the device filtering is implemented by using white listing and/or black listing. White listing defines which devices are allowed to have connection with and to send response to. Black listing defines which are not to be connected with or responded to. Black and white lists are updated by an upper layer application. The process of updating the white/black lists should be done before receiving a packet, which means that address in the received packet cannot be used to update the list.

At present, if there are multiple master devices trying to connect by sending CONNECT_REQ packets to single slave, the master device that is connected to the slave device is the one whose CONNECT_REQ packet was received first by the slave device (i.e. advertiser). Therefore, not necessarily the optimal master is selected for connection.

According to an embodiment, the advertisement procedure is modified so that at first the advertising device advertises with ADV_SCAN_IND packet, which indicates that the advertiser is scannable but not connectable. The scanners send SCAN_REQ packets, which the advertiser uses for generating a list of allowed master devices for connection. The generated list is used as a whitelist for connections. After having generated the white list, the advertiser device advertises with a new advertisement packet, this time with ADV_IND packet indicating that the advertiser is connectable.

The embodiments are useful e.g. when generating whitelists for e.g. master devices using random addresses, master devices in an environment containing multiple master devices, such as key which unlocks computer, and/or master devices being previously defined. In a mesh type of setting, where multiple master devices exist, the slave device can select the optimal master for connection using RSSI (Received Signal Strength Indication).

Figure 4:
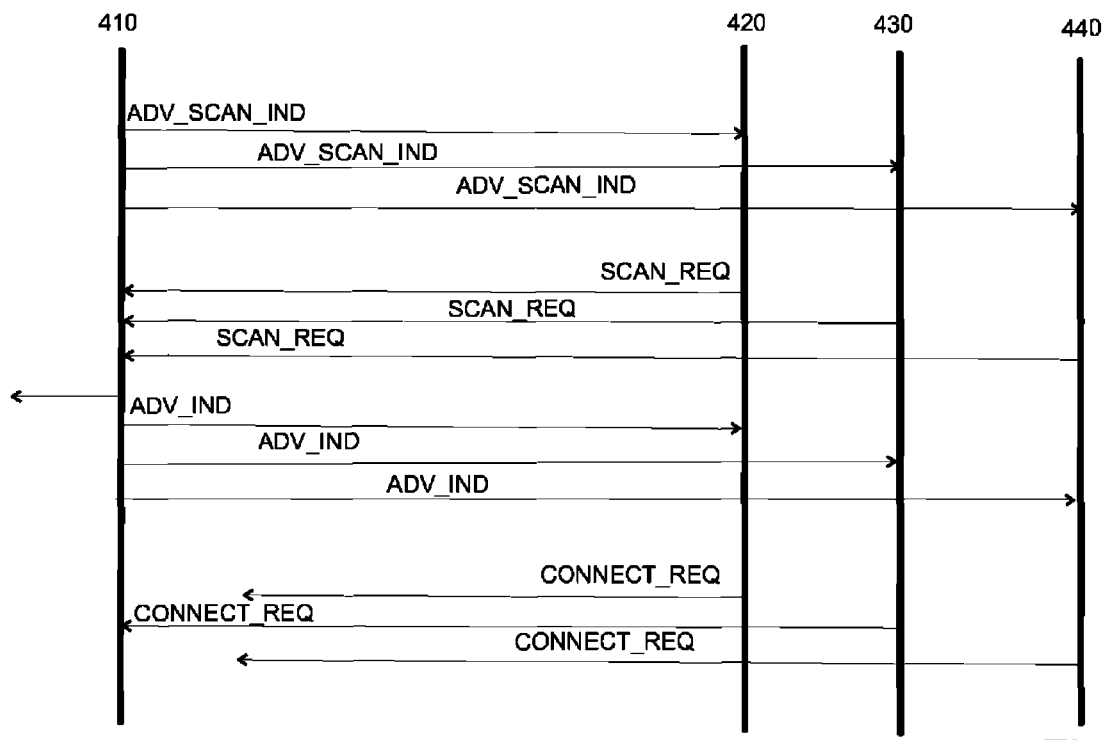
FIG. 4 shows an advertising mode according to an embodiment.

The present embodiment is illustrates in FIG. 4. FIG. 4 illustrates an advertising device 410 and scanner devices 420, 430, 440. The advertising device 410 advertises using ADV_SCAN_IND packet to gather information on scanner device 420, 430, 440. After enough data has been gathered, a list of allowed master devices is generated by the advertiser device. A scanner device is entered to the list of allowed master devices, if e.g. RSSI is high enough, there exists a bond between the scanner device and the advertiser device (i.e. encryption info has been stored for the devices), if enough time is passed from previous connection or if a device is from certain manufacturer (3 upper bytes of the address).

The generated list is fed to a link layer of the advertising device 410, where it is used as a white list for filtering the CONNECT_REQ packets.

The advertising device 410 then changes the advertisement type to ADV_IND or ADV_DIRECT_IND packet, which indicates that the advertising device is connectable. In an ADV_DIRECT_IND packet may comprises an address of the allowed connecting device. Now the received CONNECT_REQ packets are filtered according to the white list that was generated of the list of allowed devices. The advertising device 410 accepts only those CONNECT_REQ packets that are originated from a scanner device belonging to the list of allowed device. According to an embodiment, the advertising device 410 accepts only such CONNECT_REQ packet that is received from a scanner device indicated in the ADV_DIRECT_IND packet.

Figure 5:
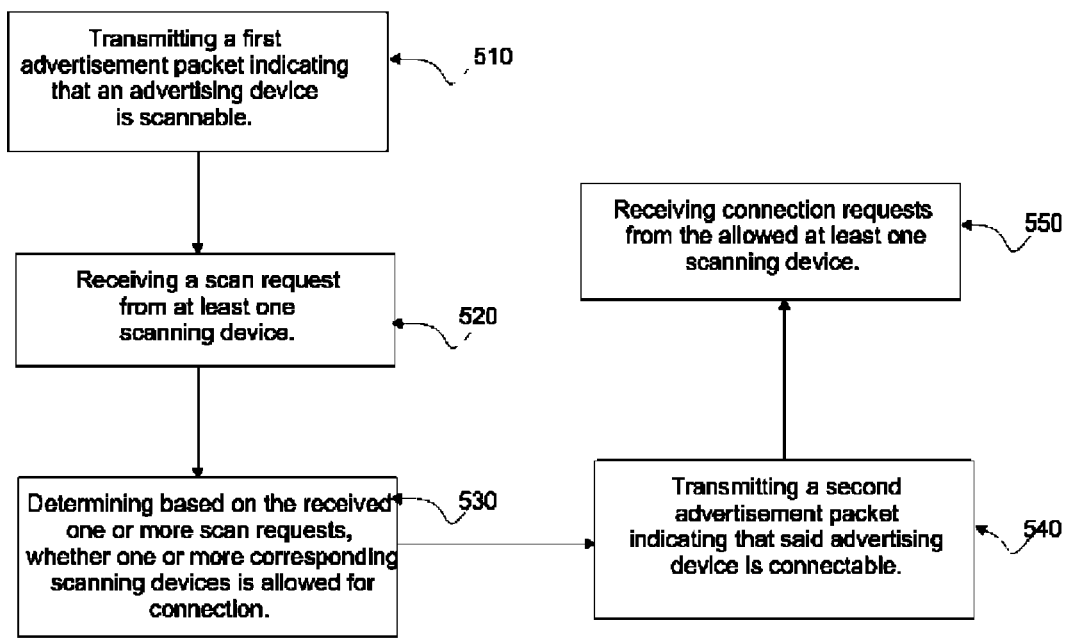
FIG. 5 shows a flowchart of a method according to an embodiment.

FIG. 5 illustrates a method according to an embodiment as a flowchart. The method according to an embodiment comprises steps for
- transmitting 510 a first advertisement packet indicating that an advertising device is scannable;
- receiving 520 a scan request from at least one scanning device;
- determining 530, based on the received one or more scan requests, whether a corresponding one or more scanning device is an allowed for connection;
- transmitting 540 a second advertisement packet indicating that said advertising device is connectable;
- receiving 550 connection requests only from the allowed at least one scanning device.

According to an embodiment, the second advertising packet is ADV_IND packet, and according to another embodiment, the second advertising packet is ADV_DIRECT_IND packet.

It is appreciated that in the previous examples, a list of allowed master devices is generated. However, it is also possible that a list of rejected master device is generated instead by using the information in the SCAN_REQ packets.

The present embodiments provide a solution where an advertising device first advertises with a packet indicating that the device is scannable, and later switches the advertising mode and advertises with a packet indicating that the device is connectable. With such an embodiment, a master device for connection can be selected.

The various embodiments may provide advantages. For example connection procedure is accelerated because there is no need to form the connection at first and then to validate the master address—and if it is noticed that the master device is not an optimal master device, to disconnect.

The various embodiments of the invention can be implemented with the help of computer program code that resides in a memory and causes the relevant apparatuses to carry out the invention.

It is obvious that the present invention is not limited solely to the above-presented embodiments, but it can be modified within the scope of the appended claims.

The invention claimed is:

1. A method, comprising:
   transmitting a first advertisement packet indicating that an advertising device is scannable;
   then receiving one or more scan requests from one or more corresponding scanning devices;
   determining, based on each of the received one or more scan requests, whether a corresponding scanning device is an allowed scanning device for connection;
   using the received one or more scan requests to generate a list of the determined scanning devices which are allowed for connection;
   then transmitting a second advertisement packet indicating that said advertising device is connectable; and
   then using the generated list to accept a connection request only from at least one of the listed allowed scanning devices.

2. The method according to claim 1, further comprising filtering received connection requests from scanning devices to accept only those connection request packets that are originated from scanning devices included in the list of allowed scanning devices that was generated using the previously received scan requests.

3. The method according to claim 1, further comprising transmitting the generated list to a link layer of the apparatus; and using the generated list in the link layer as a white list to filter the received connection request packets.

4. The method according to claim 1, wherein the determination on the allowed scanning device is based on at least one of the following data: received signal strength indication; an existing bond between devices; time period from previous connection; a manufacturer of the scanning device.

5. The method according to claim 1, wherein the first advertising packet is ADV_SCAN_IND packet.

6. The method according to claim 1, wherein the second advertising packet is ADV_IND packet.

7. The method according to claim 1, wherein the second advertising packet is ADV_DIRECT_IND packet comprising an indication of the allowed scanning device.

8. The method according to claim 1, further comprising:
   receiving multiple scan requests from multiple scanning devices in a multiple scanning device environment;
   determining one or more of the scanning devices that is transmitting scan requests having sufficiently high received signal strength indication (RSSI) to be allowed for connection; and
   generating the list of the determined one or more scanning devices which are allowed for connection based on the RSSI of their corresponding scan requests.

9. The method according to claim 1, where the method steps are performed using Bluetooth Low Energy (BLE) devices.

10. An apparatus comprising a processor and memory, wherein the apparatus is configured to:
    transmit a first advertisement packet indicating that an advertising device is scannable;
    then receive one or more scan requests from one or more corresponding scanning devices;
    determine, based on each of the one or more received scan requests, whether a corresponding scanning device is an allowed scanning device for connection;
    use the received one or more scan requests to generate a list of the determined scanning devices which are allowed for connection;

then transmit a second advertisement packet indicating that said advertising device is connectable; and then use the generated list to accept a connection request from only at least one of the listed allowed scanning devices.

11. The apparatus according to claim 10, further being configured to filter received connection requests from scanning devices to accept only those connection request packets that are originated from scanning devices included in the list of allowed scanning devices that was generated using the previously received scan requests.

12. The apparatus according to claim 10, further being configured to transmit the generated list to a link layer of the apparatus; and to use the generated list in the link layer as a white list to filter the received connection request packets.

13. The apparatus according to claim 10, being configured to determine the allowed scanning device based on at least one of the following data: received signal strength indication; an existing bond between devices; time period from previous connection; a manufacturer of the scanning device.

14. The apparatus according to claim 10, wherein the first advertising packet is ADV_SCAN_IND packet.

15. The apparatus according to claim 10, wherein the second advertising packet is ADV_IND packet.

16. The apparatus according to claim 10, wherein the second advertising packet is ADV_DIRECT_IND packet comprising an indication of the allowed scanning device.

17. The apparatus of claim 10, further being configured to:
receive multiple scan requests from multiple scanning devices in a multiple scanning device environment;
determine one or more of the scanning devices that is transmitting scan requests having sufficiently high received signal strength indication (RSSI) to be allowed for connection; and
generate the list of the determined one or more scanning devices which are allowed for connection based on the RSSI of their corresponding scan requests.

18. The apparatus of claim 10, where the apparatus is a Bluetooth Low Energy (BLE) apparatus.

19. A computer program product embodied on a non-transitory computer readable medium, comprising computer program code configured to, when executed on at least one processor, cause an apparatus or a system to:
transmit a first advertisement packet indicating that an advertising device is scannable;
then receive one or more scan requests from one or more corresponding scanning devices;
determine, based on each of the one or more received scan requests, whether a corresponding scanning device is an allowed scanning device for connection;
use the received one or more scan requests to generate a list of the determined scanning devices which are allowed for connection;
then transmit a second advertisement packet indicating that said advertising device is connectable;
then use the generated list to accept a connection request from only at least one of the listed allowed scanning devices.

20. A method, comprising:
transmitting a first advertisement packet indicating that an advertising device is scannable;
then receiving one or more scan requests from one or more corresponding scanning devices;
determining, based on each of the received one or more scan requests, whether a corresponding scanning device is a scanning device to be rejected for connection;
using the received one or more scan requests to generate a list of the determined scanning devices which are to be rejected for connection; and
then using the generated list of scanning devices to be rejected for connection to determine to reject a connection request from at least one of the scanning devices in the generated list of scanning devices to be rejected for connection.

21. An apparatus comprising a processor and memory, wherein the apparatus is configured to:
transmit a first advertisement packet indicating that an advertising device is scannable;
then receive one or more scan requests from one or more corresponding scanning devices;
determine, based on each of the received one or more scan requests, whether a corresponding scanning device is a scanning device to be rejected for connection;
use the received one or more scan requests to generate a list of the determined scanning devices which are to be rejected for connection; and
then use the generated list of scanning devices to be rejected for connection to determine to reject a connection request from at least one of the scanning devices in the generated list of scanning devices to be rejected for connection.

* * * * *